UNITED STATES PATENT OFFICE.

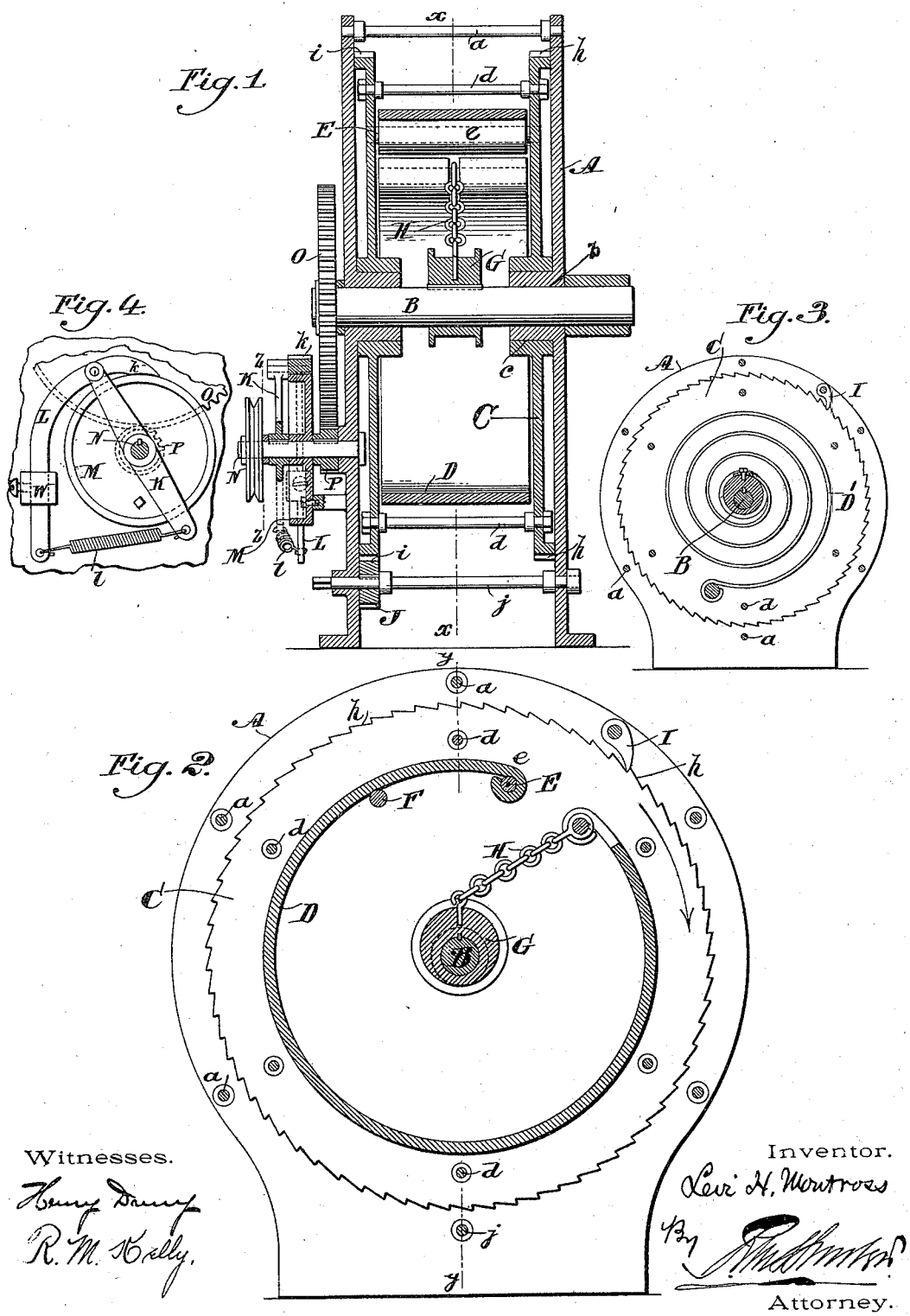

LEVI H. MONTROSS, OF CAMDEN, NEW JERSEY.

SPRING-MOTOR.

SPECIFICATION forming part of Letters Patent No. 598,529, dated February 8, 1898.

Application filed October 8, 1896. Serial No. 608,207. (No model.)

*To all whom it may concern:*

Be it known that I, LEVI H. MONTROSS, of the city and county of Camden, State of New Jersey, have invented an Improvement in Spring-Motors, of which the following is a specification.

My invention relates to spring-motors; and it consists of the improvements which are fully set forth in the following specification and are shown in the accompanying drawings.

It is the object of my invention to provide a small and compact spring-motor which may be easily and quickly wound up and which will impart power evenly and uniformly and may be rewound whenever desired without in any way affecting the speed of operation.

Usually when a spring-motor is rewound the act of winding affects the speed of operation by varying the tension of the spring or imposing frictional resistance to the driven parts. To avoid this defect, I so construct the motor that the driving and driven parts are journaled on bearings which are concentric but independent of one another, so that the rotation of the one in the act of rewinding does not affect the rotation of the other, and these parts are so connected by a spring that the effective tension will be uniformly maintained.

My invention also includes the combination of such a motor with a speed regulator or governor.

In the drawings, Figure 1 is a transverse vertical sectional view of a motor embodying my invention, taken on the line $y$ $y$ of Fig. 2. Fig. 2 is a longitudinal vertical sectional view on the line $x$ $x$ of Fig. 1. Fig. 3 is a view similar to Fig. 4, illustrating a modification; and Fig. 4 is a sectional elevation of the speed regulator or governor, taken on line $z$ $z$ of Fig. 1.

A is a suitable frame, in bearings $b$ of which the shaft B is journaled. As shown, the frame A consists of the two side frame-pieces bolted together by tie-rods $a$.

C C are two plates or disks journaled upon suitable bearings $c$ $c$ of the frame A and bolted together by tie-rods $d$, thus forming a cage rotatable upon the bearings $c$. These bearings $c$ for the cage or disks C are independent of the shaft B, so that the rotation of the cage will not put any friction upon the shaft B, or vice versa. I have shown the disks C journaled on the outside of the bearings $b$ of the shaft B.

D is a curved spring, preferably of approximately circular shape, fastened at one end, as at $e$, to the cage. I have shown the spring formed with an eye, through which a pin E, carried by the cage, extends. The end of the spring is further secured by a stop or stay pin F, carried by the cage and located on the inside of the spring at a short distance from the fastening $e$. The spring D curves about the shaft B, and its outer or free end is attached to a cam or projection G on the shaft by a suitable connection H, shown as a small chain.

The cage C is provided with ratchet-teeth $h$, which I have shown formed on the periphery of one of the disks. These ratchet-teeth engage a pawl I on the frame A, and the cage C is thus held against backward rotation.

Any suitable means may be employed for turning the cage C. For purposes of illustration I have shown one of the disks C of the cage provided on its periphery with a gear-wheel $i$, engaging a pinion J on a shaft $j$, which may be operated by a key in the usual manner.

When the cage C is rotated, the chain or connection H will be wound upon the shaft B on the cam or projection G and will draw the free end of the spring D inward toward the shaft, thus putting the spring under tension. As the cage C is held against backward rotation by the pawl I, the tension of the spring D, acting on the shaft B, will turn it back as the spring returns again to normal position. The power thus imparted to the shaft B may be transmitted through suitable multiplying-gears or belting to the parts to be driven.

By employing the cam G on the shaft B, I am able to move the shaft B uniformly, for as the tension of the spring decreases as its end moves outward the leverage through which it acts on the shaft B increases proportionally through the cam G.

In the modification shown in Fig. 3 instead of the curved spring D having its free end connected with the cam G on the shaft B, I have shown an ordinary spiral spring D', having one end connected with the cage and the other end with the shaft B. In other respects the construction may be the same.

The motor may be wound up at any time while it is running without in any way affecting its operation.

While I have described the cage C as being wound up to drive the shaft B, the operation may be reversed, and the shaft B may be wound to drive the cage. In this case the pawl and ratchet to prevent backward rotation would be applied to the shaft B.

To regulate the speed of the motor, I have shown a governor applied to it, which I shall now describe. This governor may be applied to any driven part operated by the motor, and operates by centrifugal force. I have shown the governor acting on a counter-shaft N, driven from the gear on the shaft B through a pinion P.

K is an arm or frame fast on the shaft N or other part driven by the motor, to one end of which is pivoted a lever L, having its outer end connected with the frame or arm K by a spring $l$ and provided with a weight W, which may be made adjustable, as shown. The other end of the lever K constitutes a friction nose or finger $k$ and is arranged adjacent to the periphery of a friction disk or plate M, (shown as carried by the frame A.) As the speed of the frame K increases the lever L is rocked by centrifugal force acting on the weight W, and the friction-nose $k$ is forced down upon the plate M, thus acting to govern the speed of the motor. The spring $l$ acts to normally hold the nose $k$ out of action until its tension is overcome by the centrifugal force acting on the weight W.

The details of construction which have been shown may be varied without departing from the invention.

What I claim as new, and desire to secure by Letters Patent, is as follows:

1. A spring-motor, consisting of a rotary driven part journaled in suitable bearings, a rotary driving part journaled on bearings independent of the driven part but concentric therewith, and a curved spring between the rotary driven and driving parts.

2. A spring-motor, consisting of a rotary shaft journaled in suitable bearings and provided with a cam, a rotary frame journaled on bearings independent of the shaft but concentric therewith, a curved spring fastened at one end to the rotary frame, and a connection between the free end of the spring and the high part of the cam upon the shaft.

3. A spring-motor, consisting of a rotary driven part journaled in suitable bearings, a rotary driving part journaled on bearings independent of the driven part but concentric therewith, a curved spring between the rotary driven and driving parts, and a governor acting upon the driven part to control the speed thereof.

4. A spring-motor, consisting of a rotary driven part journaled in suitable bearings, a rotary driving part journaled on bearings independent of the driven part but concentric therewith, a curved spring between the rotary driven and driving parts, and a governor acting upon the driven part to control the speed thereof, consisting of a frame carried by a driven part, a weighted lever carried thereby and provided with a friction-nose, a friction-plate arranged adjacent to the friction-nose, and a spring between the outer end of the lever and the frame which carries it.

5. A spring-motor, consisting of a frame A, a shaft journaled therein, a cage consisting of two disks C, C, united together and journaled concentrically with the shaft on bearings $c$, $c$ independent of the shaft, and a curved spring surrounding the shaft and connected therewith at one end and with the cage at the other end.

6. A spring-motor, consisting of a frame A, a shaft journaled therein, a cage consisting of two disks C, C, united together and journaled concentrically with the shaft on bearings $c$, $c$ independent of the shaft, a cam G carried by the shaft, a curved spring D encircling the shaft and secured at one end to the cage, and a connection H between the free end of the spring and the high part of the cam G.

7. A spring-motor consisting of a rotary driven part journaled on suitable bearings, a rotary driving part journaled on bearings independent of the bearings of the driven part but concentric therewith, and a curved spring D secured at one end with the rotary driving part and having its free end connected with the driven part by a flexible connection H.

8. A spring-motor consisting of a rotary driven part journaled on suitable bearings, a rotary winding-piece journaled in bearings independent of the bearings of the rotary driven part but concentric therewith, so that the rotation of said winding-piece will not impose friction upon the driven part, and a spring connection between the winding-piece and the driven part adapted to be put under tension when the winding-piece is rotated.

In testimony of which invention I have hereunto set my hand.

LEVI H. MONTROSS.

Witnesses:
ERNEST HOWARD HUNTER,
ANDREW ZANE.